United States Patent
Allen

(10) Patent No.: US 10,525,802 B2
(45) Date of Patent: Jan. 7, 2020

(54) ROOF SYSTEM FOR USE IN A VEHICLE

(71) Applicant: Honda Motor Co., Ltd., Tokyo (JP)

(72) Inventor: Zachary J. Allen, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/997,782

(22) Filed: Jun. 5, 2018

(65) Prior Publication Data

US 2019/0366817 A1 Dec. 5, 2019

(51) Int. Cl.
*B60J 7/04* (2006.01)
*B60J 7/043* (2006.01)
*B60J 10/82* (2016.01)
*B60J 7/057* (2006.01)

(52) U.S. Cl.
CPC .............. *B60J 7/043* (2013.01); *B60J 10/82* (2016.02); *E05Y 2900/55* (2013.01)

(58) Field of Classification Search
CPC .......... B60J 7/043; B60J 7/057; B60J 7/0573
USPC ................................. 296/216.06–216.08, 223
See application file for complete search history.

(56) References Cited

U.S. PATENT DOCUMENTS

| | | | |
|---|---|---|---|
| 6,224,146 B1 * | 5/2001 | Willard | ........... B60J 7/0435 296/216.03 |
| 6,394,540 B1 | 5/2002 | Manders | |
| 6,435,605 B2 | 8/2002 | Tsuruo et al. | |
| 7,850,230 B2 * | 12/2010 | Faerber | ........... B60J 7/0435 296/216.03 |
| 8,857,903 B2 | 10/2014 | Nellen et al. | |
| 9,227,493 B2 | 1/2016 | Nellen et al. | |
| 2012/0110912 A1 | 5/2012 | Panozzo et al. | |
| 2017/0267076 A1 | 9/2017 | Knoepfle et al. | |

FOREIGN PATENT DOCUMENTS

| | | |
|---|---|---|
| CN | 102910054 A | 2/2013 |
| CN | 105916714 A | 8/2016 |
| WO | 2017042002 A1 | 3/2017 |

* cited by examiner

*Primary Examiner* — Dennis H Pedder
(74) *Attorney, Agent, or Firm* — Armstrong Teasdale LLP

(57) ABSTRACT

A roof system for use in a vehicle having a roof opening. The system includes a movable closure panel and a guide rail including a main channel and a pull cable slide channel both oriented to extend in a lengthwise direction relative to the vehicle. A longitudinal slot provides access to the pull cable slide channel. The system includes a front slide member and a pull cable actuator. The front slide member includes a first portion enclosed within the pull cable slide channel, and a second portion positioned within the main channel. The guide rail is configured to substantially prevent the front slide member from being discharged towards the roof opening. The actuator includes a rear slide member coupled to the front slide member, wherein the panel is coupled to the front slide member such that the actuator selectively covers and uncovers the roof opening with the panel.

20 Claims, 3 Drawing Sheets

ROOF SYSTEM FOR USE IN A VEHICLE

BACKGROUND

The field of the present disclosure relates generally to sunroof systems for use in motor vehicles and, more specifically, to a roof system configured to retain a sunroof panel relative to the motor vehicle.

At least some known motor vehicles include a sunroof system that permits natural light and air to enter a passenger compartment of the motor vehicle. Sunroof systems generally include a sunroof panel made of glass that is selectively movable between a closed position and an open position. When in the closed position, the sunroof panel is located within an opening defined in a roof panel of the motor vehicle such that light may pass through the sunroof panel, but not air. When the sunroof system is in the open position, the sunroof panel translates generally rearward to expose the opening in the roof panel, thereby permitting light and air to enter the passenger compartment through the opening in the roof panel.

In at least some known sunroof systems, the closure panel is guided between the closed and open positions along a sunroof frame positioned about the opening in the roof panel. More specifically, the sunroof frame includes a pair of guide rails that extend in a lengthwise direction of the motor vehicle, and at least one slider mechanism that is coupled between the closure panel and the pair of guide rails. The slider mechanism facilitates guiding the closure panel in the forward and aft directions, and also facilitates coupling the closure panel to the guide rails. As such, it is desirable for the sunroof system to be designed in a robust manner that facilitates retaining the closure panel relative to the sunroof frame during normal operation or during an unexpected impact event, for example.

BRIEF DESCRIPTION

In one aspect, a roof system for use in a vehicle having a roof opening is provided. The roof system includes a movable closure panel and a guide rail including a main channel and a pull cable slide channel that are both oriented to extend in a lengthwise direction relative to the vehicle. The guide rail further includes a longitudinal slot that provides access to the pull cable slide channel. The roof system also includes a front slide member and a pull cable actuator. The front slide member includes a first portion enclosed within the pull cable slide channel, and a second portion positioned within the main channel. The guide rail is configured to substantially prevent the front slide member from being discharged towards the roof opening. The pull cable actuator includes a rear slide member coupled to the front slide member, wherein the movable closure panel is coupled to the front slide member such that the pull cable actuator is configured to selectively cover and uncover the roof opening with the movable closure panel.

In another aspect, a vehicle is provided. The vehicle includes a roof panel having a roof opening defined therein. The vehicle further includes a movable closure panel and a guide rail including a main channel and a pull cable slide channel that are both oriented to extend in a lengthwise direction relative to the vehicle. The guide rail further includes a longitudinal slot that provides access to the pull cable slide channel. The roof system also includes a front slide member and a pull cable actuator. The front slide member includes a first portion enclosed within the pull cable slide channel, and a second portion positioned within the main channel. The guide rail is configured to substantially prevent the front slide member from being discharged towards the roof opening. The pull cable actuator includes a rear slide member coupled to the front slide member, wherein the movable closure panel is coupled to the front slide member such that the pull cable actuator is configured to selectively cover and uncover the roof opening with the movable closure panel.

In yet another aspect, a roof system for use in a vehicle having a roof opening is provided. The roof system includes a movable closure panel and a sunroof frame including a front frame, a rear frame, and a pair of guide rails spaced laterally from each other and extending between the front frame and the rear frame. Each guide rail includes a main channel and a pull cable slide channel that are both oriented to extend in a lengthwise direction relative to the vehicle. Each guide rail further includes a longitudinal slot that provides access to the pull cable slide channel. The system also includes a front slide member and a pull cable actuator. The front slide member includes a first portion enclosed within the pull cable slide channel, and a second portion positioned within the main channel. Each guide rail is configured to substantially prevent the front slide member from being discharged towards the roof opening. The pull cable actuator includes a rear slide member coupled to the front slide member, wherein the movable closure panel is coupled to the front slide member such that said pull cable actuator is configured to selectively cover and uncover the roof opening with the movable closure panel.

DETAILED DESCRIPTION

The embodiments described herein relate generally to a roof system configured to retain a sunroof panel relative to the motor vehicle. More specifically, the roof system described herein includes a movable closure panel, a guide rail, and a pull cable actuator including a rear slide member. At least a portion of the rear slide member is enclosed, and is configured to slide in the forward and aft directions relative to the motor vehicle, within a pull cable slide channel of the guide rail. The roof system described herein further includes a front slide member coupled the closure panel. Similar to the rear slide member, at least a portion of the front slide member is also enclosed, and configured to slide in the forward and aft directions, within the pull cable slide channel. The pull cable slide channel is generally enclosed except for a longitudinal slot, which extends in a lengthwise direction relative to the motor vehicle. In addition, the front slide member is fabricated at least partially from a robust material, such as metal. As such, the configuration of the pull cable slide channel, the positioning of the front slide member within the pull cable slide channel, and the robust nature of the front slide member all facilitate securely retaining the movable closure panel relative to the motor vehicle.

Figure 1:
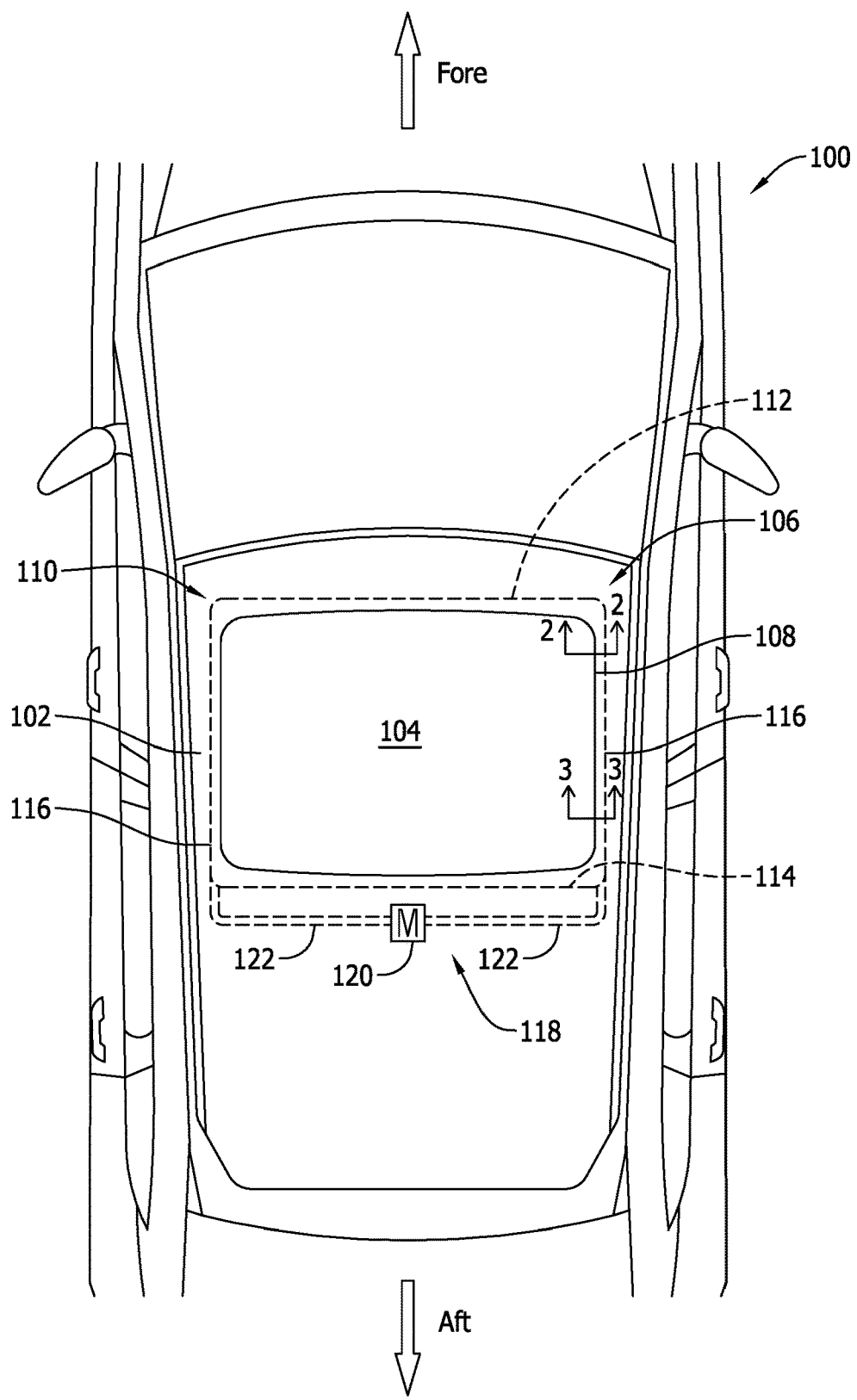
FIG. 1 is a top plan view of an exemplary motor vehicle including an exemplary roof system.

FIG. 1 is a top plan view of an exemplary motor vehicle 100. In the exemplary embodiment, motor vehicle 100 includes a roof panel 102 and a roof opening 104 defined therein. Motor vehicle 100 also includes a roof system 106 for use in selectively covering and exposing roof opening 104. More specifically, roof system 106 includes a movable closure panel 108 sized to cover roof opening 104 when in a closed position, and that exposes roof opening 104 when translated rearward into an open position. In one embodiment, movable closure panel 108 is fabricated from glass that is at least partially transparent.

Roof system 106 also includes a sunroof frame 110 coupled within roof panel 102 and circumscribing roof opening 104. In the exemplary embodiment, sunroof frame 110 includes a front frame 112, a rear frame 114, and a pair of guide rails 116 spaced laterally from each other and extending between front frame 112 and rear frame 114. The pair of guide rails 116 are oriented to extend in a lengthwise direction (i.e., the forward-aft direction) relative to motor vehicle 100. In addition, the pair of guide rails 116 are adapted to accommodate at least one slider mechanism (not shown in FIG. 1), or at least one tilt-and-slide mechanism, as will be described in more detail below. As such, the pair of guide rails 116 facilitate translating movable closure panel 108 in the forward-aft direction when selectively covering and uncovering roof opening 104.

In one embodiment, roof system 106 includes a pull cable actuator 118. Pull cable actuator 118 includes a motor 120 and cables 122 coupled, either directly or indirectly, to movable closure panel 108. During operation, motor 120 actuates cables 122 in a push-pull operation, which results in selective movement of movable closure panel 108 relative to roof opening 104. In an alternative embodiment, translation of movable closure panel 108 may be effectuated using any mechanism that enables roof system 106 to function as described herein.

Figure 2:
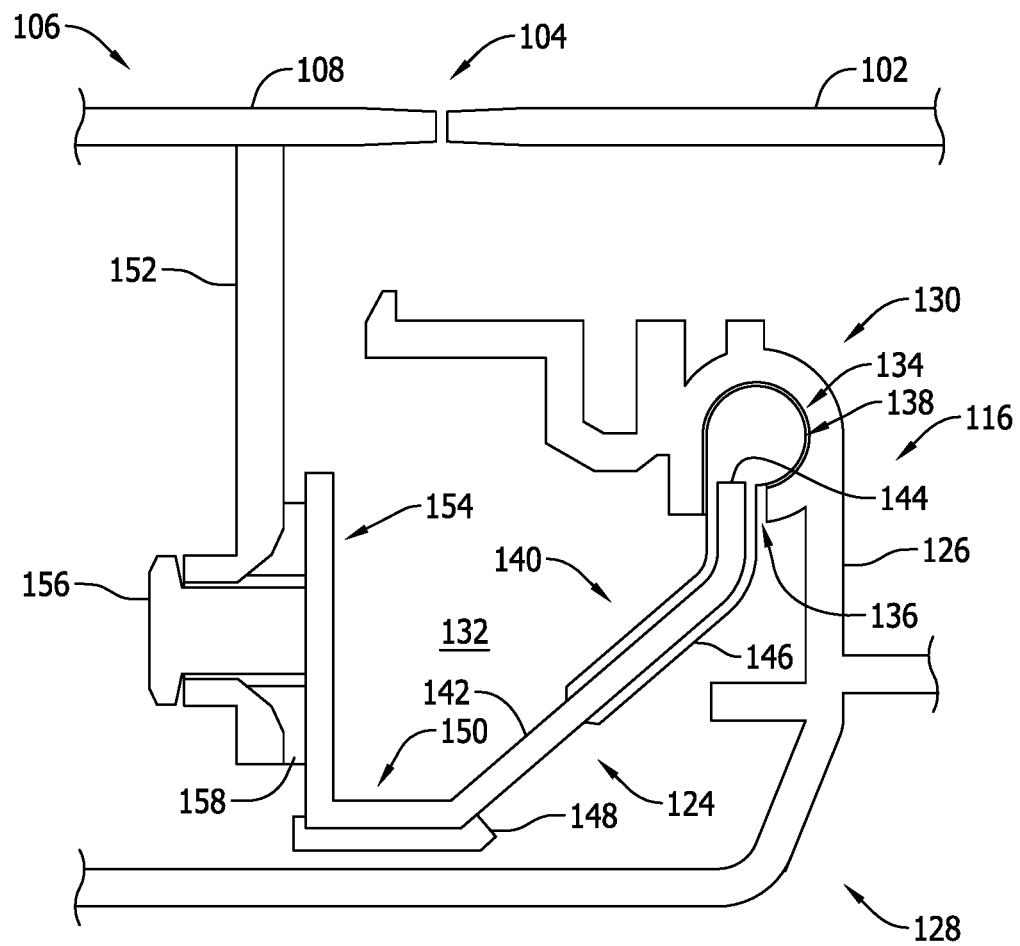
FIG. 2 is a cross-sectional view of the roof system used in the motor vehicle shown in FIG. 1, as taken along Line 2-2.

FIG. 2 is a cross-sectional view of roof system 106, as taken along Line 2-2 (shown in FIG. 1). In the exemplary embodiment, roof system 106 includes guide rail 116, and a front slide member 124 in sliding engagement with guide rail 116. Guide rail 116 is defined by a frame body 126 including an inner portion 128 and an outer portion 130, which are both defined relative to a passenger compartment of motor vehicle 100 (shown in FIG. 1). Guide rail 116 further includes a main channel 132 and a pull cable slide channel 134 that are both oriented to extend in the lengthwise direction of motor vehicle 100. In one embodiment, main channel 132 is defined between inner portion 128 and outer portion 130 of frame body 126, and pull cable slide channel 134 is defined within outer portion 130 of frame body 126. Guide rail 116 also includes a longitudinal slot 136, defined in outer portion 130, that provides access to pull cable slide channel 134.

In the exemplary embodiment, pull cable slide channel 134 is generally enclosed, in that the cross-sectional profile of longitudinal slot 136 is smaller than the cross-sectional profile of pull cable slide channel 134. In addition, longitudinal slot 136 is oriented to face away from roof opening 104, which facilitates inhibiting front slide member 124 from being discharged towards roof opening 104. As such, pull cable slide channel 134 is adapted to not only facilitate selective movement of front slide member 124 relative to guide rail 116, but also to securely affix front slide member 124 to motor vehicle 100.

As noted above, front slide member 124 is slidably engaged with guide rail 116. More specifically, front slide member 124 includes a first portion 138 enclosed within pull cable slide channel 134, and a second portion 140 positioned within main channel 132. First portion 138 is shaped with a substantially similar cross-sectional profile as that of pull cable slide channel 134. First portion 138 is also slightly undersized, cross-sectionally, relative to pull cable slide channel 134 such that first portion 138 is capable of slidably translating within pull cable slide channel 134.

In the exemplary embodiment, front slide member 124 includes a metal bracket 142 and at least one plastic overmold feature formed on metal bracket 142. Metal bracket 142 includes a first end 144 at least partially positioned within pull cable slide channel 134, which facilitates increasing the structural integrity, rigidity, and durability of first portion 138 of front slide member 124. In addition, the at least one plastic overmold feature includes a first overmold feature 146 and a second overmold feature 148. First overmold feature 146 forms first portion 138, and is sized to be enclosed within pull cable slide channel 134. Moreover, first overmold feature 146 extends from first end 144 of metal bracket 142, and extends along at least a portion of second portion 140 of front slide member 124. As such, first overmold feature 146 facilitates promoting translation of first portion 138 within pull cable slide channel 134, and also facilitates reducing wear damage to frame body 126 of guide rail 116 by reducing friction between front slide member 124 and guide rail 116.

In the exemplary embodiment, second portion 140 of front slide member 124 is contoured to define a bottom end 150 positioned a lesser distance from inner portion 128 of frame body 126 than a remainder of front slide member 124. Thus, in one embodiment, second overmold feature 148 is formed on bottom end 150 of front slide member 124 to form a skid plate on second portion 140 of front slide member 124. More specifically, second overmold feature 148 is positioned between guide rail 116 and second portion 140 within main channel 132. As such, second overmold feature 148 facilitates promoting selective movement of second portion 140 within main channel 132, and also facilitates reducing wear to frame body 126 of guide rail 116. In an alternative embodiment, front slide member 124 may be formed from any material that facilitates increasing the rigidity and durability of front slide member 124.

In some embodiments, roof system 106 further includes a linkage arm 152 extending between movable closure panel 108 and front slide member 124. More specifically, second portion 140 of front slide member 124 includes a vertically-oriented end 154, which is coupled to linkage arm 152 at a pivot point. For example, roof system 106 includes a pivot pin 156 coupled between second portion 140 and linkage arm 152, which enables movable closure panel 108 to be tilted from a seated position within roof opening 104 and then translated rearward. Roof system 106 further includes a bushing 158 positioned about pivot pin 156 between second portion 140 and linkage arm 152. In one embodiment, bushing 158 is formed from a non-metallic material to facilitate attenuating the auditory and vibratory response when linkage arm 152 pivots relative to front slide member 124.

Figure 3:
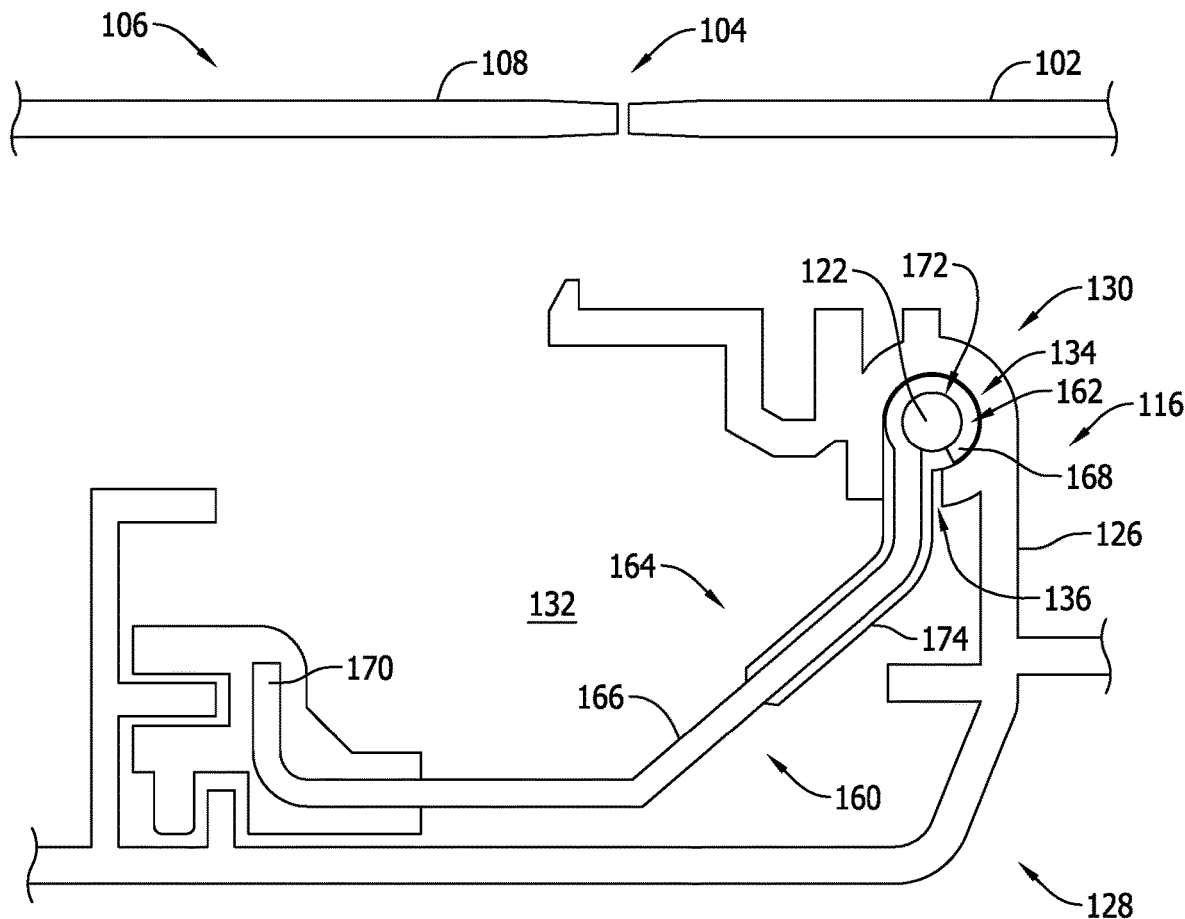
FIG. 3 is a cross-sectional view of the roof system used in the motor vehicle shown in FIG. 1, as taken along Line 3-3.

FIG. 3 is a cross-sectional view of roof system 106, as taken along Line 3-3 (shown in FIG. 1). In the exemplary embodiment, roof system 106 and, more specifically, pull cable actuator 118 (shown in FIG. 1) includes a rear slide member 160 that slidably engages guide rail 116. More specifically, similar to front slide member 124, rear slide member 160 includes a first portion 162 enclosed within pull cable slide channel 134, and a second portion 164 positioned within main channel 132.

In the exemplary embodiment, cable 122 of pull cable actuator 118 is coupled to first portion 162 of rear slide member 160. More specifically, rear slide member 160 includes a metal bracket 166 having a first end 168 positioned within pull cable slide channel 134, and a second end 170 positioned within main channel 132. First end 168 is shaped to define an eyelet 172, and cable 122 is insertable through eyelet 172 for engaging rear slide member 160. First end 168 has a first plastic overmold feature 174 formed thereon, and second end 170 has a second plastic overmold feature 176 formed thereon. As such, first plastic overmold feature 174 and second plastic overmold feature 176 facilitate promoting translation of rear slide member 160 within pull cable slide channel 134, and also facilitate reducing wear damage to frame body 126 of guide rail 116.

In operation, cable 122 is actuated by motor 120 in a push-pull operation, and actuation of cable 122 facilitates translating rear slide member 160 relative to guide rail 116. In addition, rear slide member 160 is coupled to front slide member 124 such that the cable actuation results in translation of front slide member 124 as well. Front slide member 124 and rear slide member 160 may be directly coupled to each other, or may be indirectly coupled to each through one or more intermediate components of roof system 106, such as movable closure panel 108.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A roof system for use in a vehicle having a roof opening, said roof system comprising:
    a movable closure panel;
    a guide rail comprising a main channel and a pull cable slide channel that are both oriented to extend in a lengthwise direction relative to the vehicle, wherein said guide rail further comprises a longitudinal slot that provides access to said pull cable slide channel;
    a front slide member comprising a first portion enclosed within said pull cable slide channel, and a second portion positioned within said main channel, wherein said guide rail is configured to substantially prevent said front slide member from being discharged towards the roof opening; and
    a pull cable actuator comprising a rear slide member coupled to said front slide member, said rear slide member comprising a first portion enclosed within said pull cable slide channel, wherein said movable closure panel is coupled to said front slide member such that said pull cable actuator is configured to selectively cover and uncover the roof opening with said movable closure panel.

2. The roof system in accordance with claim 1, wherein said front slide member comprises a metal bracket and at least one plastic overmold feature formed on said metal bracket.

3. The roof system in accordance with claim 2, wherein said metal bracket comprises a first end positioned within said pull cable slide channel.

4. The roof system in accordance with claim 2, wherein said at least one plastic overmold feature comprises a first overmold feature that forms said first portion enclosed within said pull cable slide channel.

5. The roof system in accordance with claim 4, wherein said first overmold feature extends along at least a portion of said second portion of said front slide member.

6. The roof system in accordance with claim 2, wherein said at least one plastic overmold feature comprises a second overmold feature that forms a skid plate on said second portion of said front slide member, said second overmold feature positioned between said guide rail and said second portion within said main channel.

7. The roof system in accordance with claim 1 further comprising a linkage arm extending between said movable closure panel and said front slide member, wherein said second portion is coupled to said linkage arm at a pivot point.

8. The roof system in accordance with claim 7 further comprising a pivot pin coupled between said second portion and said linkage arm, and a bushing positioned about said pivot pin.

9. The roof system in accordance with claim 8, wherein said bushing is formed from non-metallic material.

10. The roof system in accordance with claim 1, wherein said rear slide member comprises a first portion enclosed within said pull cable slide channel, and a second portion positioned within said main channel, said pull cable actuator further comprising a cable coupled to said first portion of said rear slide member.

11. A vehicle comprising
    a roof panel comprising a roof opening defined therein;
    a movable closure panel;
    a guide rail having comprising a main channel and a pull cable slide channel that are both oriented to extend in a lengthwise direction relative to the vehicle, wherein said guide rail further comprises a longitudinal slot that provides access to said pull cable slide channel, and wherein said pull cable slide channel has a substantially circular cross-sectional shape;
    a front slide member comprising a first portion enclosed within said pull cable slide channel, and a second portion positioned within said main channel, wherein said guide rail is configured to substantially prevent said front slide member from being discharged towards said roof opening; and
    a pull cable actuator comprising a rear slide member coupled to said front slide member, wherein said movable closure panel is coupled to said front slide member such that said pull cable actuator is configured to selectively cover and uncover said roof opening with said movable closure panel.

12. The vehicle in accordance with claim 11, wherein said front slide member comprises a metal bracket and at least one plastic overmold feature formed on said metal bracket.

13. The vehicle in accordance with claim 12, wherein said metal bracket comprises a first end positioned within said pull cable slide channel.

14. The vehicle in accordance with claim 12, wherein said at least one plastic overmold feature comprises a first overmold feature that forms said first portion enclosed within said pull cable slide channel.

15. The vehicle in accordance with claim 14, wherein said first overmold feature extends along at least a portion of said second portion of said front slide member.

16. The vehicle in accordance with claim 12, wherein said at least one plastic overmold feature comprises a second overmold feature that forms a skid plate on said second portion of said front slide member, said second overmold feature positioned between said guide rail and said second portion within said main channel.

17. The vehicle in accordance with claim 11 further comprising a linkage arm extending between said movable closure panel and said front slide member, wherein said second portion is coupled to said linkage arm at a pivot point.

18. The vehicle in accordance with claim 17 further comprising a pivot pin coupled between said second portion and said linkage arm, and a bushing positioned about said pivot pin.

19. The vehicle in accordance with claim 11, wherein said rear slide member comprises a first portion enclosed within said pull cable slide channel, and a second portion positioned within said main channel, said pull cable actuator further comprising a cable coupled to said first portion of said rear slide member.

20. A roof system for use in a vehicle having a roof opening, said roof system comprising:
- a movable closure panel;
- a sunroof frame comprising:
  - a front frame;
  - a rear frame; and
  - a pair of guide rails spaced laterally from each other and extending between said front frame and said rear frame, wherein each guide rail comprises a main channel and a pull cable slide channel that are both oriented to extend in a lengthwise direction relative to the vehicle, wherein said each guide rail further comprises a longitudinal slot that provides access to said pull cable slide channel;
- a front slide member comprising a first portion enclosed within said pull cable slide channel, and a second portion positioned within said main channel, wherein said each guide rail is configured to substantially prevent said front slide member from being discharged towards the roof opening; and
- a pull cable actuator comprising a rear slide member coupled to said front slide member, said rear slide member comprising a first portion enclosed within said pull cable slide channel, wherein said movable closure panel is coupled to said front slide member such that said pull cable actuator is configured to selectively cover and uncover the roof opening with said movable closure panel.

* * * * *